March 11, 1924.
P. B. BELCHES
1,486,218
CLUTCH PEDAL LOCKING DEVICE
Filed Aug. 6, 1923
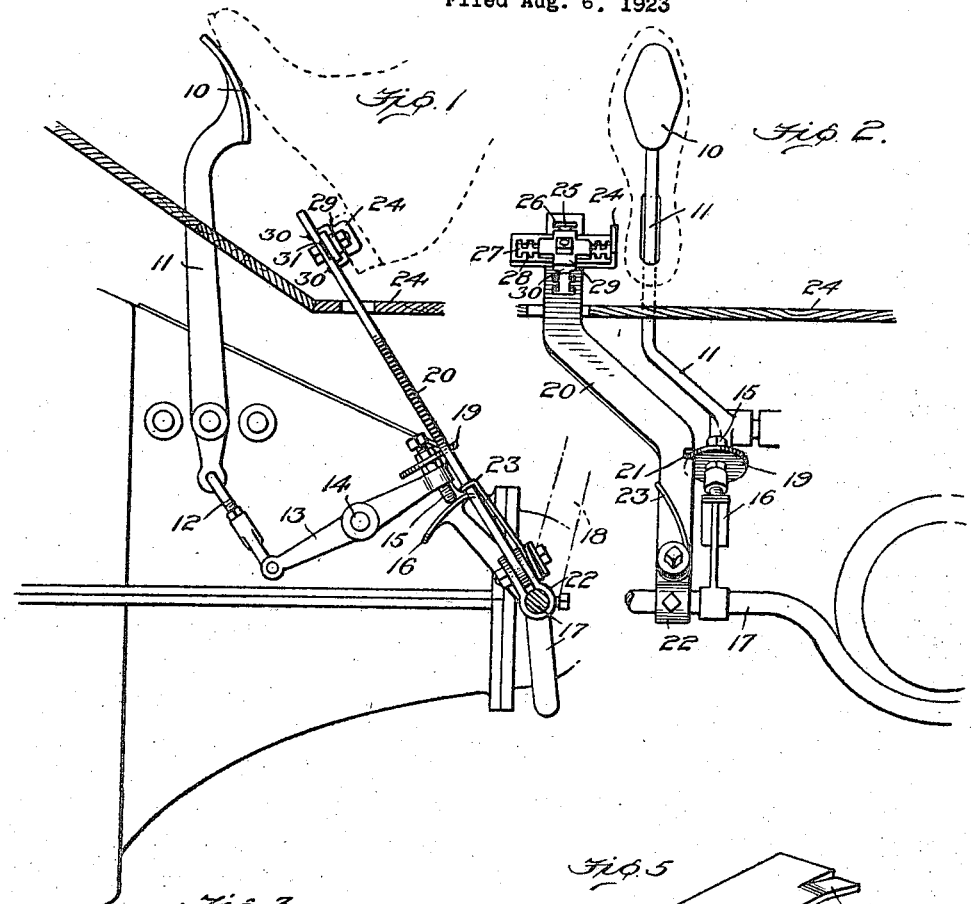
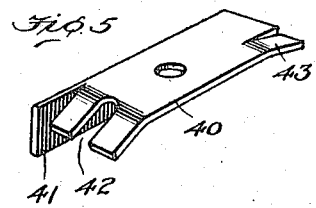
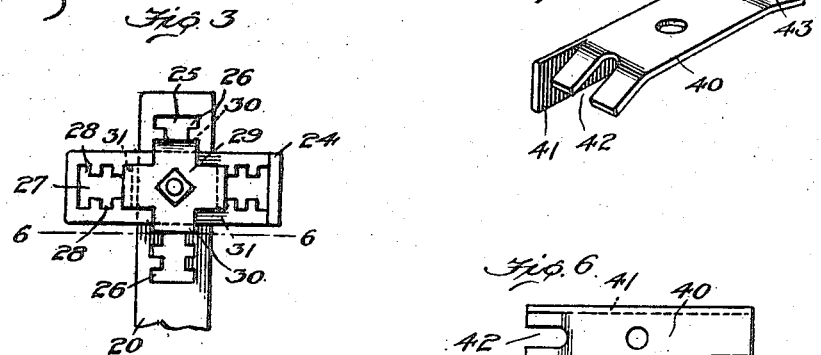
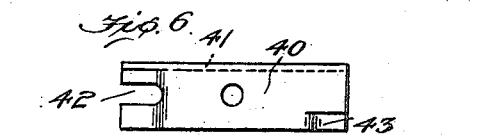
Inventor
Peter B. Belches
By
Attorneys Patented Mar. 11, 1924.

1,486,218

UNITED STATES PATENT OFFICE.

PETER B. BELCHES, OF ST. LOUIS, MISSOURI.

CLUTCH-PEDAL-LOCKING DEVICE.

Application filed August 6, 1923. Serial No. 656,119½.

*To all whom it may concern:*

Be it known that I, PETER B. BELCHES, a citizen of the United States, residing at St. Louis, in the State of Missouri, have invented certain new and useful Improvements in Clutch-Pedal-Locking Devices; and I do hereby declare the following to be a full, clear, and exact description of the same, reference being had to the accompanying drawings, forming part of this specification.

This invention relates to a latching device for locking the clutch pedal and gear shifting mechanism of a motor vehicle in their neutral positions, the present structure being especially adapted to that type of gear shifting mechanism found in the Ford motor car.

An object of the present invention is to provide a gear shifting mechanism latch comprising a comparatively small number of parts of simple construction that can be manufactured at a low cost and that can be easily applied to the vehicle without the necessity of altering the structure or arrangement of any of the parts of the car.

A further object is to provide a lock that will maintain the parts in neutral position regardless of the position occupied by the emergency brake and regardless of the amount of wear that has taken place on the segment found on the brake lever shaft of Ford cars for moving the clutch pedal and connections to neutral position.

With these and other objects in view, the invention consists in certain details of construction and combinations and arrangements of parts, all as will be hereinafter more fully described and the novel features thereof particularly pointed out in the appended claims.

In the accompanying drawings—

Figure 1 is a side elevation of a portion of the gear case of a Ford car showing the present invention embodied in the gear shifting connections, the emergency brake lever being shown in dotted lines;

Fig. 2 is a similar view taken at right angles to Fig. 1, some of the parts of Fig. 1 being omitted;

Fig. 3 is a detail elevation of the catch member;

Fig. 4 is a detail view of the adjustable end of said catch member; and

Fig. 5 is a detail showing a modification of the latch member.

Figure 6 is another view of the latch member shown in Fig. 5.

As usual, the transmission gears are adapted to be moved into high or low speed positions or into their neutral or inoperative position by the pedal 10 on one end of a lever 11 pivoted intermediate its ends. The gear shifting connections between said pedal and gears embody a link 12 connecting pedal lever 11 to a lever 13 pivoted at 14 intermediate its ends, the link 12 being attached to one of the ends of lever 13. At its opposite end, lever 13 has the usual adjustable, threaded bolt 15 which is adapted to be engaged by the segment 16 mounted on the shaft 17 that is rocked by the emergency brake lever 18. The operation of these parts is believed to be well understood. When the brake lever is "off" or moved forward, segment 16 is moved from beneath bolt 15 and said bolt is free to move downward upon pedal 10 being moved into its high speed position but when the emergency brake is applied segment 16 is rocked and moved beneath bolt 15 for the purpose of engaging and moving the bolt 15 upward and shifting the several connections to their neutral position.

Continuous use of the emergency brake lever, however, causes appreciable wear on the upper face of segment 16 and when the segment is positioned under the bolt 15 the worn surface of the segment will allow a slight downward movement of the parts with the result that the clutch will be somewhat effective to slowly propel the vehicle.

While this wear on the segment may be compensated for, by adjusting the threaded bolt 15, the catch of the present invention is designed to lock the lever 13 and the connected pedal 10 in their neutral positions without relying upon the upper face of segment 16 to support the bolt. Close adjustment of said bolt is thereby rendered unnecessary and the locking device is operative independent of the brake lever, the lock being capable of locking the parts in neutral when the operator moves pedal 10 from high speed position to neutral with his foot and does not actuate the emergency brake lever.

In the embodiment of the invention illustrated in Figs. 1 to 4, a latch, such as a lateral projection in the form of a washer 19, is provided on the bolt 15, being positioned on the bolt by suitable means such as a lock nut. Said washer 19 is adapted to engage a catch, preferably in the form of an elongated lever 20 having a recess 21 therein for cooperation with said washer. The washer 19 can, of course, be easily placed on bolt 15 and for convenience in securing the catch lever in place, it is preferably pivoted at its lower end to a clip 22 on the brake lever shaft 17.

The catch 20 is yieldingly urged towards the bolt 15 by a spring 23 suitably secured to the parts and when the parts assume their neutral position, the washer 19 will enter the recess 21 in catch lever 20 where it will be held until the operator releases it. For this purpose, the upper end of catch lever 20 protrudes above the floor 24 of the car and is located where the operator can conveniently engage it with his foot to retract it against the tension of spring 21. The catch lever being conveniently located by pedal 10, the operator can, if desired, hold the lever out of engagement with the washer when moving the pedal from its low speed position to its high speed position or vice versa, as for instance, when in a traffic jam. This is easily accomplished as the ball of the foot may remain on pedal 10 and the catch lever engaged with the heel of the shoe.

As will be apparent, should the operator desire, to stop the car and still permit the engine to idle, he will move the foot pedal 10 to its neutral position whereupon the washer 19 will enter recess 21. The washer 19, bolt 15, lever 13, etc., will then be supported by the catch lever in their neutral positions, thereby insuring against the pedal 10 moving backward and the car starting accidentally. This regardless of the position occupied by the emergency brake lever and the segment 16 actuated thereby.

In actual use, the end of the catch lever 20 is engaged by the heel of the operator's shoe and it is, therefore, desirable that this end of said lever be properly positioned relatively to the point where the operator's heel will be positioned in driving the car, whether the heel of the operator's shoe be large or small. As the heels of men's shoes are considerably larger than those of women's, it is preferred that said lever be formed with an adjustable end portion in the nature of a heel plate 24. A convenient arrangement for permitting adjustment of the end or heel plate is to form a slot 25 and a series of notches 26 in the end of lever 20 and a similar slot 27 and notches 28 in the heel plate.

The slot and rows of recesses in lever 20 are a little longer than the width of plate 24 and the two slots 25 and 27 extend at right angles to each other and a clamp 29, having depending ears 30, 31 secures said plate on the lever. The ears 30 project down beside the plate 24 into recesses 26 and the ears 31 project into recesses 28 in the heel plate, the plate being adjustable both length-wise and cross-wise of lever 20 by placing the clamp ears in any of the notches desired.

The modified form of latch shown in Fig. 5 consists of an elongated plate like stamping 40 that is secured on bolt 15 instead of the washer 19. This stamping 40 is reinforced by a rib 41 and its forward end has a notch 42 therein whereby the plate is straddled over the lever 13 to prevent said latch plate turning on the bolt. The opposite end of said latch plate is slit and has an off-set portion 43 which will enter the recess in the catch lever only when said off-set portion assumes a position perpendicular to said lever, i. e., when the foot pedal 10 assumes neutral position. With this construction the catch lever may, if desired, be secured on the emergency brake lever shaft at a point directly behind and in line with pedal 10.

What is claim is:—

1. In a motor vehicle, the combination with the lever operated gear shifting mechanism, of means for releasably locking said mechanism against movement from its neutral position, said locking means comprising a projection removably carried by one of the connections of said mechanism, said connection having a screw-threaded aperture therein for attachment of said projection, a catch pivoted at one side of said projection and movable toward and away from the projection, and means for yieldingly retaining said catch in the path traversed by said projection.

2. In a motor vehicle, the combination with the gear shifting connections, said connections embodying a lever having a screw-threaded aperture therein and means for rocking said lever on its pivotal center, of a latch secured in said aperture in the lever and movable in the plane in which said lever is rocked, and a pivoted catch member movable in a plane intersecting the plane of movement of said latch and adapted to engage said latch when the latter assumes its neutral position and releasably locking said lever against movement in either direction about its pivotal center.

3. In a motor vehicle, a combination with the gear shifting mechanism comprising a lever and means for rocking said lever, of a latch removably and adjustably mounted on and movable with said lever, a catch pivoted at one side of said lever and engageable with said latch when the latter assumes its neutral position to releasably lock the lever against movement in either direction about its pivotal center.

4. In a motor vehicle, the combination with the gear shifting connections comprising a lever and means for rocking said lever, of a set screw secured in the lever, a projection adjustable on said screw, means for retaining said projection in any of its adjusted positions, a catch lever pivoted at one side of said lever and having a recess therein for engagement with said projection when the gear shifting connections assume a neutral position, and means for holding the catch lever in position to engage the projection.

5. In a motor vehicle, the combination with the gear shifting connections comprising a lever and means for rocking said lever, a brake lever, a shaft on which the brake lever is mounted, and means on said shaft for holding the gear shifting connections in their neutral positions upon application of the brake by the brake lever, of means for locking said gear shifting connections in their neutral positions, said locking means comprising a latch on the rocking lever, and a catch on the brake lever shaft movable independently of said shaft towards and from the latch and adapted to engage said latch when the connections assume their neutral position.

6. In a motor vehicle, the combination with the gear shifting connections comprising a lever and means for rocking said lever, a brake lever, a shaft on which the brake lever is mounted, and means on said shaft for shifting and holding the connections in their neutral positions upon application of the brakes by the brake lever, of means for locking said connections in their neutral positions independently of the last mentioned means, said locking means comprising a projection carried by the rocking lever, a clip secured on the brake lever shaft, and a catch lever pivoted in said clip and having a recess therein adapted to engage said projection when the gear shifting connections assume their neutral positions.

7. In a motor vehicle, the combination with the pedal operated gear shifting connections comprising a lever, of a latch adjustably mounted on and movable with said lever, a pivoted catch engageable with said latch when the latter assumes a neutral position, and an extension on said catch having its end located in proximity to said pedal and a heel plate on the end of said extension adjustable transversely of said pedal.

8. In a motor vehicle, the combination with the gear shifting mechanism comprising a lever, and a bolt secured on said lever, of a latch adjustably mounted on and movable with said lever, said latch embodying a plate carried by said bolt and having one end notched and straddling said lever, and a pivoted catch engageable with said latch when the latter assumes its neutral position.

PETER B. BELCHES.